United States Patent
Vanacore et al.

(10) Patent No.: US 12,225,859 B2
(45) Date of Patent: Feb. 18, 2025

(54) FARMING SYSTEM

(71) Applicant: Evergreens, LLC, Hudson, MA (US)

(72) Inventors: Mark Vanacore, Arlington, MA (US);
Ahmad Zameli, Cambridge, MA (US);
Jonathan Toll, Medford, MA (US)

(73) Assignee: Evergreens, LLC, Hudson, MA (US)

( * ) Notice: Subject to any disclaimer, the term of this patent is extended or adjusted under 35 U.S.C. 154(b) by 0 days.

(21) Appl. No.: 17/492,074

(22) Filed: Oct. 1, 2021

(65) Prior Publication Data
US 2022/0117177 A1    Apr. 21, 2022

Related U.S. Application Data

(60) Provisional application No. 63/094,276, filed on Oct. 20, 2020.

(51) Int. Cl.
*A01G 31/02*    (2006.01)
*A01G 9/02*    (2018.01)

(52) U.S. Cl.
CPC ............... *A01G 31/02* (2013.01); *A01G 9/02* (2013.01)

(58) Field of Classification Search
CPC .......... A01G 31/02; A01G 9/02; A01G 9/047; A01G 9/033; Y02P 60/21
USPC .......................................................... 47/65.9
See application file for complete search history.

(56) References Cited

U.S. PATENT DOCUMENTS

| | | | | |
|---|---|---|---|---|
| 4,528,774 A * | 7/1985 | Skaife | ...................... | A01G 9/02 47/81 |
| 4,976,064 A * | 12/1990 | Julien | ..................... | A01G 31/02 239/545 |
| 2005/0241231 A1* | 11/2005 | Bissonnette | .......... | A01G 31/00 47/81 |
| 2008/0236041 A1* | 10/2008 | Carpenter | ............. | A01G 9/033 47/65.9 |
| 2011/0289839 A1* | 12/2011 | Cronk | .................... | A01G 9/033 47/65.9 |
| 2013/0047507 A1* | 2/2013 | Tinapple | .................. | A01G 9/02 47/81 |
| 2015/0342129 A1* | 12/2015 | Boylan | .................. | A01G 9/042 47/65.5 |
| 2019/0208711 A1* | 7/2019 | Sahu | ...................... | A01G 9/249 |
| 2021/0251163 A1* | 8/2021 | Pape | ........................ | A01G 2/10 |
| 2022/0039329 A1* | 2/2022 | Mitchell | .................. | A01G 9/02 |

FOREIGN PATENT DOCUMENTS

| CN | 205642914 U | * 10/2016 | |
|---|---|---|---|
| GB | 2545163 A | * 6/2017 | ............ A01G 31/00 |
| RU | 2733788 C1 | * 10/2020 | |
| WO | WO-2021260536 A1 | * 12/2021 | |

* cited by examiner

*Primary Examiner* — Magdalena Topolski
*Assistant Examiner* — Spencer T Callaway
(74) *Attorney, Agent, or Firm* — Wolf, Greenfield & Sacks, P.C.

(57) ABSTRACT

Embodiments disclosed herein include a container for growing crops. In some embodiments, the container includes a hydroponic irrigation zone arranged to provide hydroponic irrigation to a first portion of a root zone of the crops, an aeroponic irrigation zone arranged to provide aeroponic irrigation to a second portion of the root zone, and a growing surface. The container may be used in a farming system.

9 Claims, 8 Drawing Sheets

FARMING SYSTEM

CROSS-REFERENCE TO RELATED APPLICATIONS

This application claims the benefit under 35 U.S.C. § 119(e) of U.S. Provisional Application Ser. No. 63/094,276, titled "FARMING SYSTEM," filed on Oct. 20, 2020, which is incorporated herein by reference in its entirety.

FIELD

The disclosed embodiments relate to farming systems, such as automated farming systems.

BACKGROUND

Crops may be grown by planting seeds in soil, allowing the crops to grow, and harvesting the crops from the ground and/or from one or more bushes or trees. Crops also may be grown without the use of soil. For example, crops may be grown via aeroponics or hydroponics.

SUMMARY

According to some embodiments, a container for growing crops includes a hydroponic irrigation zone arranged to provide hydroponic irrigation to a first portion of a root zone of a crop, an aeroponic irrigation zone arranged to provide aeroponic irrigation to a second portion of the root zone, and a growing surface arranged to receive one or more seeds.

According to another embodiment, a method of growing crops with a container having an aeroponic irrigation zone and a hydroponic irrigation zone is disclosed. The method includes providing hydroponic irrigation to a first portion of a root zone of a crop via the hydroponic irrigation zone of the container and providing aeroponic irrigation to a second portion of the root zone via the aeroponic irrigation zone of the container.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As is known, crops are traditionally grown by planting seeds in soil, allowing the crops to grow, and harvesting the crops from the ground and/or from one or more bushes or trees. Crops have also been grown without the use of soil. For example, crops may be grown via aeroponics, where crops are grown in air and misted with water. Crops also may be grown via hydroponics, with the roots being exposed to a nutritious liquid. For example, the roots may be at least partially submerged in an aqueous solution with nutrients.

The inventors have recognized that advantages may be realized by growing crops via a hybrid farming system using both hydroponic and aeroponic irrigation. For example, in some embodiments, as will be described, the farming system may be arranged such that a first portion of the roots of the crops may be irrigated via aeroponic irrigation while a second portion of the roots may be irrigated via hydroponic irrigation.

In some embodiments, the first portion of the roots may include an upper root zone. In such embodiments, the upper root zone, also referred to as an aeroponic root zone, may be suspended in air and sprayed with water and/or nutrients. For example, the aeroponic root zone may be misted with water and/or nutrients. In some embodiments, the second portion of the roots may include a lower root zone. In such embodiments, the lower root zone, also referred to as the hydroponic root zone, may be at least partially placed in water and nutrients. For example, the hydroponic root zone may be at least partially disposed in a pool of water. In some embodiments, a distal end of the roots may be at least partially submerged in water and nutrients while another portion of the roots are misted with water and nutrients.

In some embodiments, the disclosed system may provide an improved growing environment for crops. For example, as compared to systems that use only one type of irrigation (e.g., aeroponic irrigation or only hydroponic irrigation), the disclosed system may irrigate the crops via two water and/or nutrient sources. As such, if the water and/or nutrient sources were to unexpectedly stop working, the crops could still be irrigated during the growing process and thereafter harvested. As will be appreciated, in other known systems, failure of a water and/or nutrient source may require discarding of the crops. Providing additional irrigation may also expedite growth in some embodiments.

The inventors have also recognized the benefits of growing crops in a container arranged to provide hydroponic and aeroponic irrigation to the crops, such as to the roots (e.g., the hydroponic and aeroponic root zones) of the crops. In some embodiments, the container may include an aeroponic irrigation zone arranged to allow the roots to be misted and a hydroponic irrigation zone to allow the roots to be placed in an aqueous solution with nutrients.

The inventors have further recognized the benefits of providing a container that allows the crops to be divided into multiple growing areas that may be modular and mobile. For example, instead of having a single, larger container in which all the crops are grown, the farming system may utilize several, smaller containers for growing crops. In such embodiments, the containers may be separated from one another, allowing multiple crops to be grown within the same area.

Such modularity may allow for easy to clean crops and root zones. For example, if necessary, an operator may remove a single container for harvesting and/or cleaning of the container. Such mobility also may allow for easy automation of the farming system from seeding to harvesting of the crops. For example, in some embodiments, one or more containers may be placed into a farming system (see FIG. 7) and moved along different portions of the farming process, such as from seeding, to growing, and thereafter to harvesting and packaging. In such an example, should part of the crops be diseased or not be growing properly, one or more affected containers may be removed from the farming system without disrupting the growth of the other crops in the other containers in the system.

In view of the above, embodiments disclosed herein include a farming system arranged to irrigate crops via a hybrid hydroponic and aeroponic irrigation system. In some embodiments, the farming system includes one or more containers arranged to grow crops. In some embodiments, the containers include a first aeroponic irrigation zone arranged to allow the roots to be sprayed (e.g., misted) and a second hydroponic irrigation zone arranged to allow at least a portion of the roots to be placed in an aqueous solution with nutrients.

In some embodiments, the container includes one or more openings for water and/or nutrients to be sprayed onto the roots in the aeroponic irrigation zone. In some embodiments, the container may include one or more channels or troughs to hold water and/or nutrients. In some embodiments, the recesses may include one or more drain holes, such as for periodic draining.

In some embodiments, the container may include a tray. In some embodiments, the container may include a box. In some embodiments, the container may be a perforated piece of plastic. The container also may be formed of a polyethylene (PE), stainless steel, or PVC. In some embodiments, the containers may be formed of a food grade material.

In some embodiments, the container includes a growing surface arranged to separate the growing area from the root zones. In some embodiments, one or more seeds are arranged to be placed on or at least partially in the growing surface. For example, one or more seeds may be loaded on top of the growing surface. As another example, one or more seeds may be loaded in the growing surface. In some embodiments, the growing surface may include a material secured to an upper surface of the container, such as to the lip of the container. In some embodiments, the material may be formed of an organic fabric material. For example, in some embodiments, the fabric material may include bamboo fiber, felt, burlap, biostrate, Rockwoll, coco coir, and/or combinations thereof.

In some embodiments, the container may be designed to be reusable, with the container being cleaned (e.g., via a foodsafe cleaning agent) and dried in between uses. In other embodiments, the container may be disposable and discarded after each use. In some embodiments, the container may be formed of a biodegradable material.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
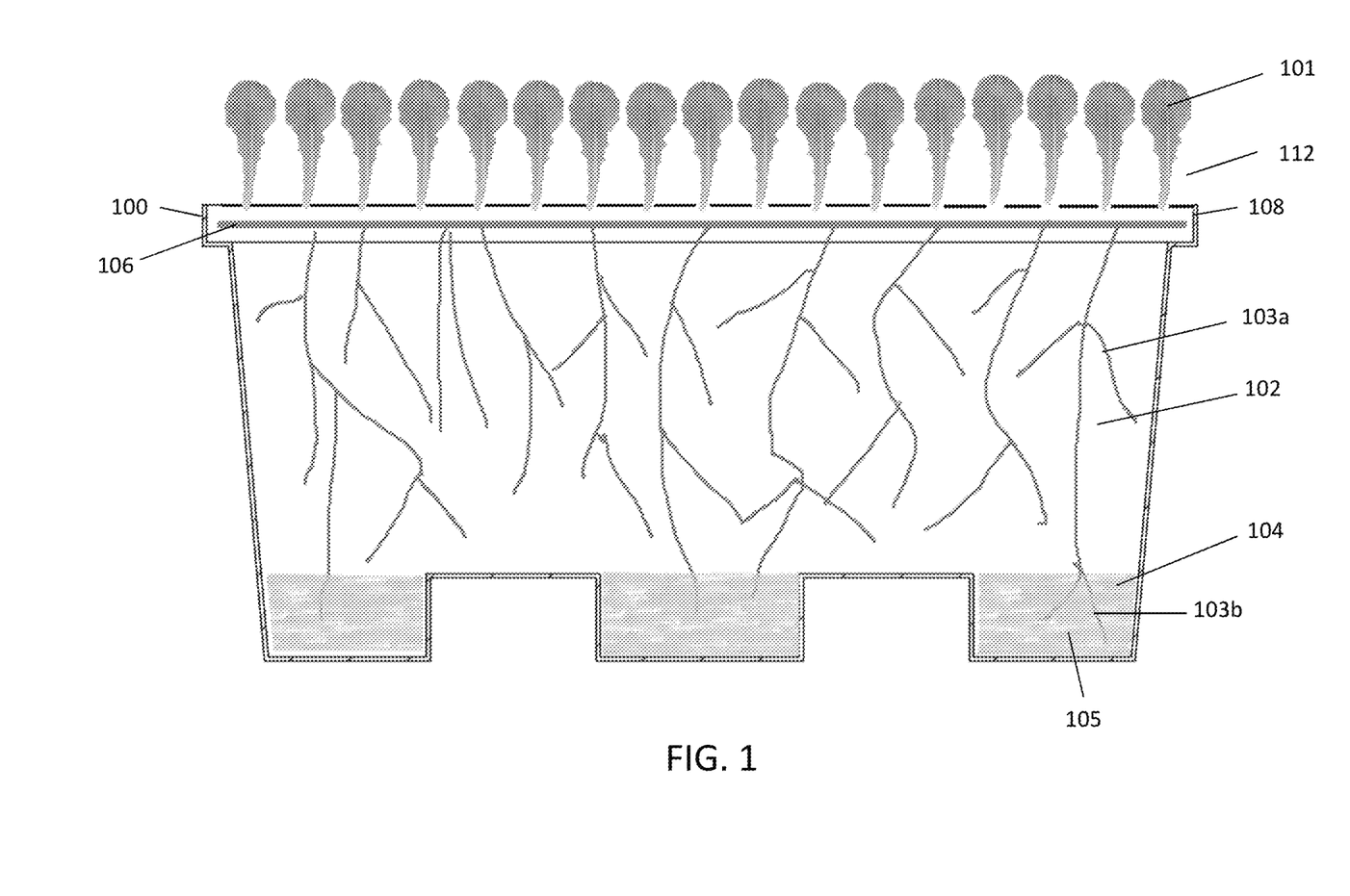
FIG. 1 shows a container used to grow crops according to embodiments of the present disclosure.

FIG. 1 illustrates a container 100 used to grow crops 101 according to aspects of the present disclosure. As shown in this view, the container may include an aeroponic irrigation zone 102 in which a first portion 103a of the roots of the crops, the aeroponic root zone, may be irrigated via aeroponic irrigation. For example, the first portion of the roots may be sprayed (e.g., missed) with nutrients and/or water via openings in the container. The container also may include a hydroponic irrigation zone 104 in which a second portion 103b of the roots, a hydroponic root zone, may be irrigated via hydroponic irrigation. For example, in some embodiments, the second portion of the roots may be placed in water and/or nutrients 105.

Figure 5:
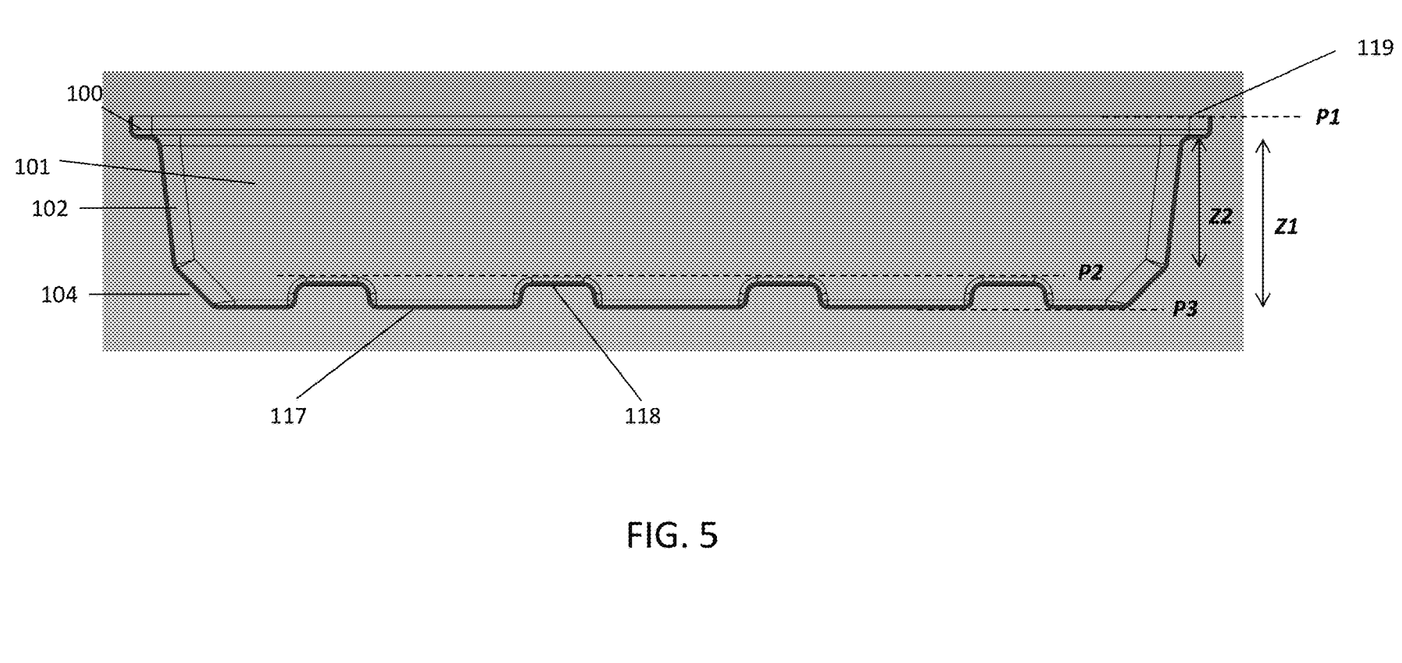
FIG. 5 is a cross-sectional side view of a container used to grow crops according to some embodiments.

In some embodiments, as shown in FIG. 5, a height Z1 of the root zone 101 may be between about 2 inches and about 24 inches. For example, the height of the root zone may be between about 2 and 20 inches, between about 2 and 15 inches, or between about 2 and 12 inches. In some embodiments, a height Z2 of the aeroponic zone 102 may be between about 1 inch and 6 inches.

Figure 2A:
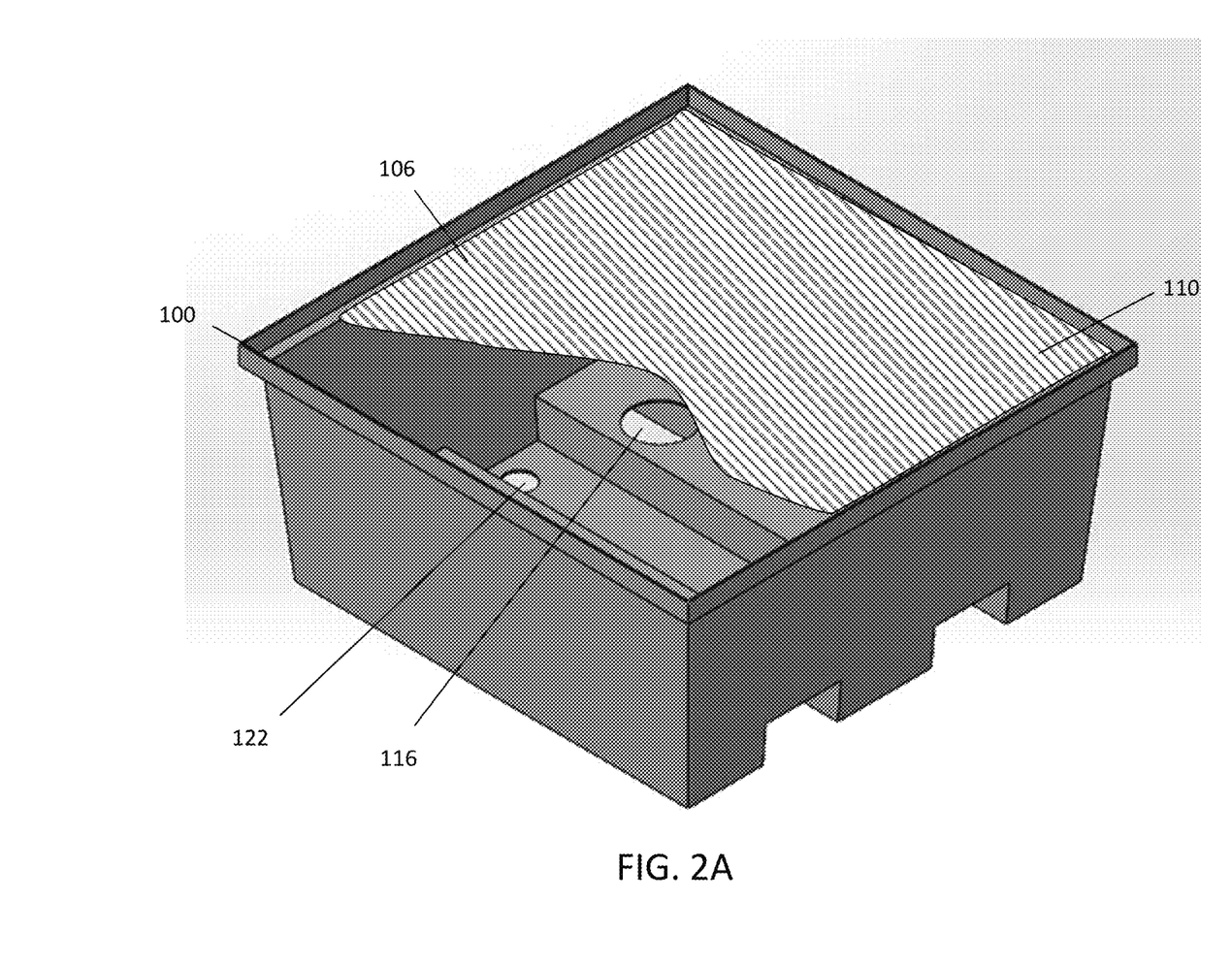
FIG. 2A is a perspective view of a container with an attached growing surface according to some embodiments, with a portion of the growing surface shown cut away.

As also shown in FIG. 1, a growing surface 106 is attachable to the container. As described above, the growing surface may be formed of an organic fabric material, such as bamboo fiber, felt, burlap, biostrate, Rockwoll, coco coir, and/or combinations thereof. In some embodiments, seeds may be applied to a first side 110 of the growing surface 106 (see FIG. 2A), or at least partially in the growing surface. As will be appreciated, the first side may include the outwardly facing side of the growing surface. During the growing phase, the roots of the crops may penetrate through the growing surface and into the container (see FIG. 1). In such embodiments, the crops (e.g., leafy greens) may grow above the growing surface, in a growing area 112.

Figure 2B:
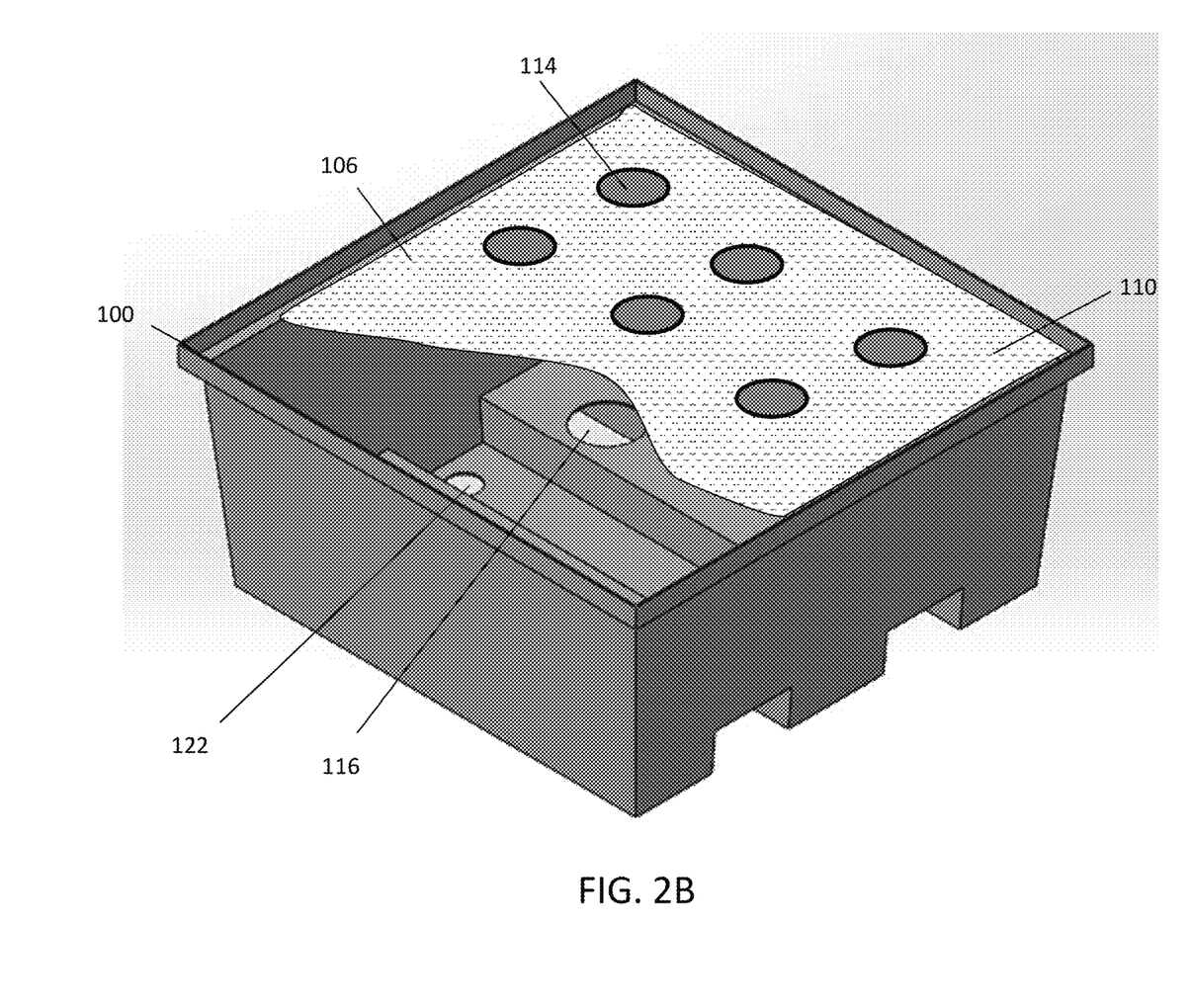
FIG. 2B is a perspective view of a container with an attached growing surface according to other embodiments, with a portion of the growing surface shown cut away.

In other embodiments, such as with larger plants (e.g., strawberries, basil, and tomatoes), the growing surface may include a sheet of plastic (see FIG. 2B) with openings 114 to hold the plants. For example, in some embodiments, the plants may be placed in net cups that are attachable to the plastic sheet (e.g. at each opening).

In some embodiments, the growing surface may be attachable at or near an upper surface of the container, such as at an upper rim of the container. In some embodiments, as shown in FIG. 1, the growing surface may be attachable to a ledge 108 that extends around the perimeter of the container.

In some embodiments, the growing surface may be directly attached to the container. For example, the growing surface may be glued or otherwise fixedly adhered to the container (e.g., to the rim of the container). In some embodiments, the growing surface may be attached (e.g., glued) to the entire perimeter of the container. In other embodiments, the growing surface may be attached to only portions of the perimeter of the container. For example, in some embodiments, the container may include one or more clips or fasteners arranged to hold the growing surface to the container, such as at each corner of the container.

Figure 6:
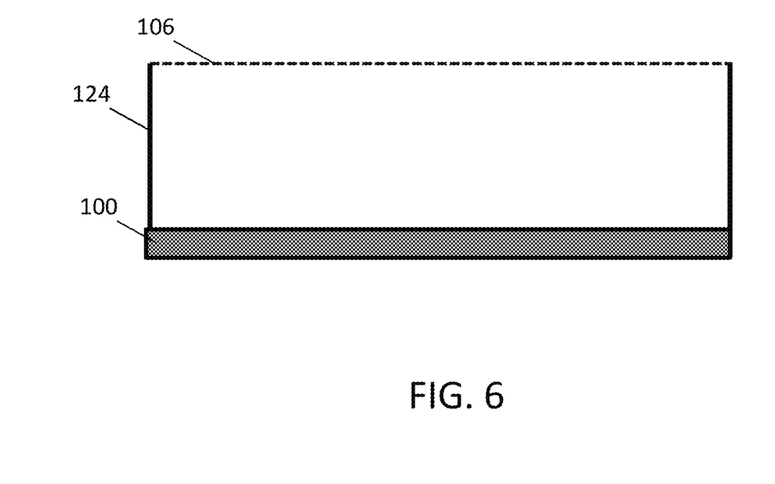
FIG. 6 is a side view of a container used to grow crops according to other embodiments.

In other embodiments, the growing surface may be indirectly attached to the container. For example, in some embodiment, as shown in FIG. 6, the growing surface 106 may be attachable to a frame 124 that is connected to the container. In some embodiments, the frame may extend upwardly and away from the container. In such embodiments, the aeroponic zone may be formed by the frame, with the hydroponic zone being formed by the container. In such embodiments, the growing surface may be attached to the frame via any suitable methods, such as via fasteners.

Figure 3:
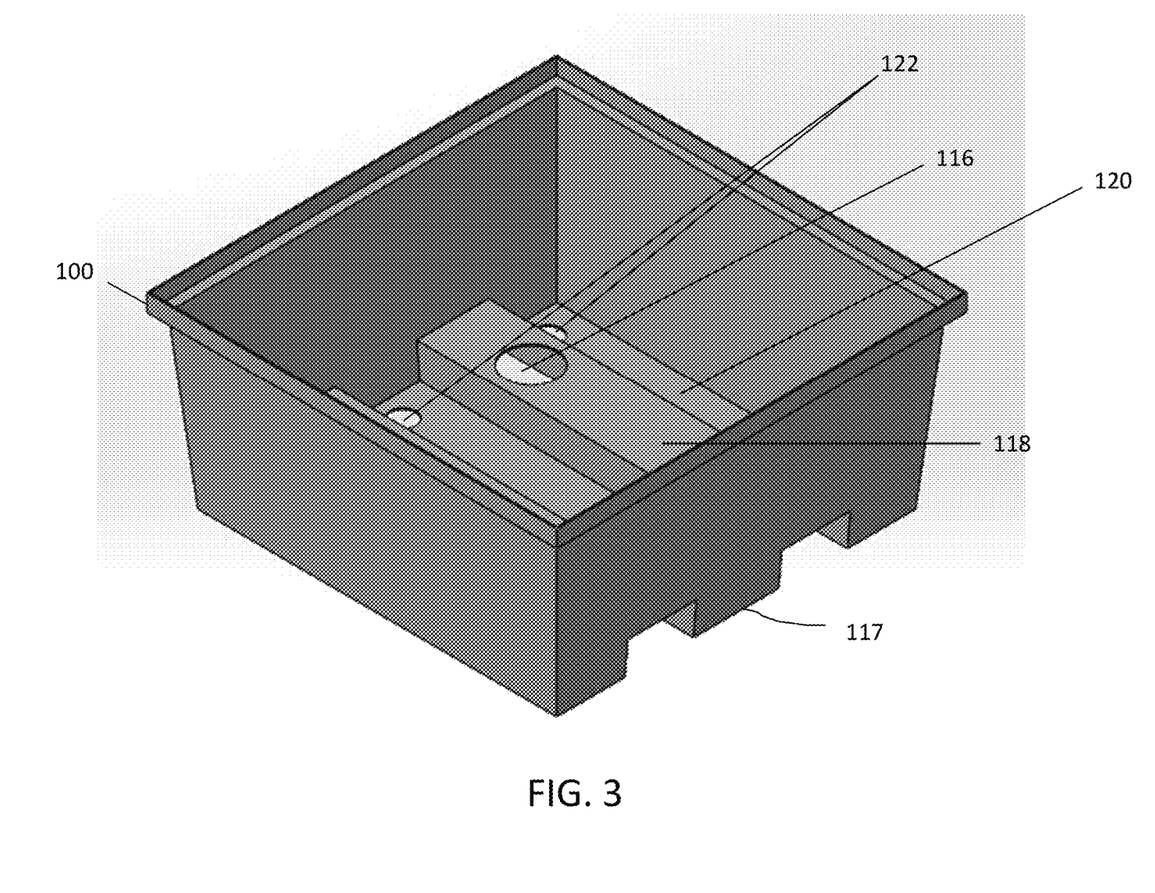
FIG. 3 is a perspective view of the container of FIG. 2A.
Figure 4:
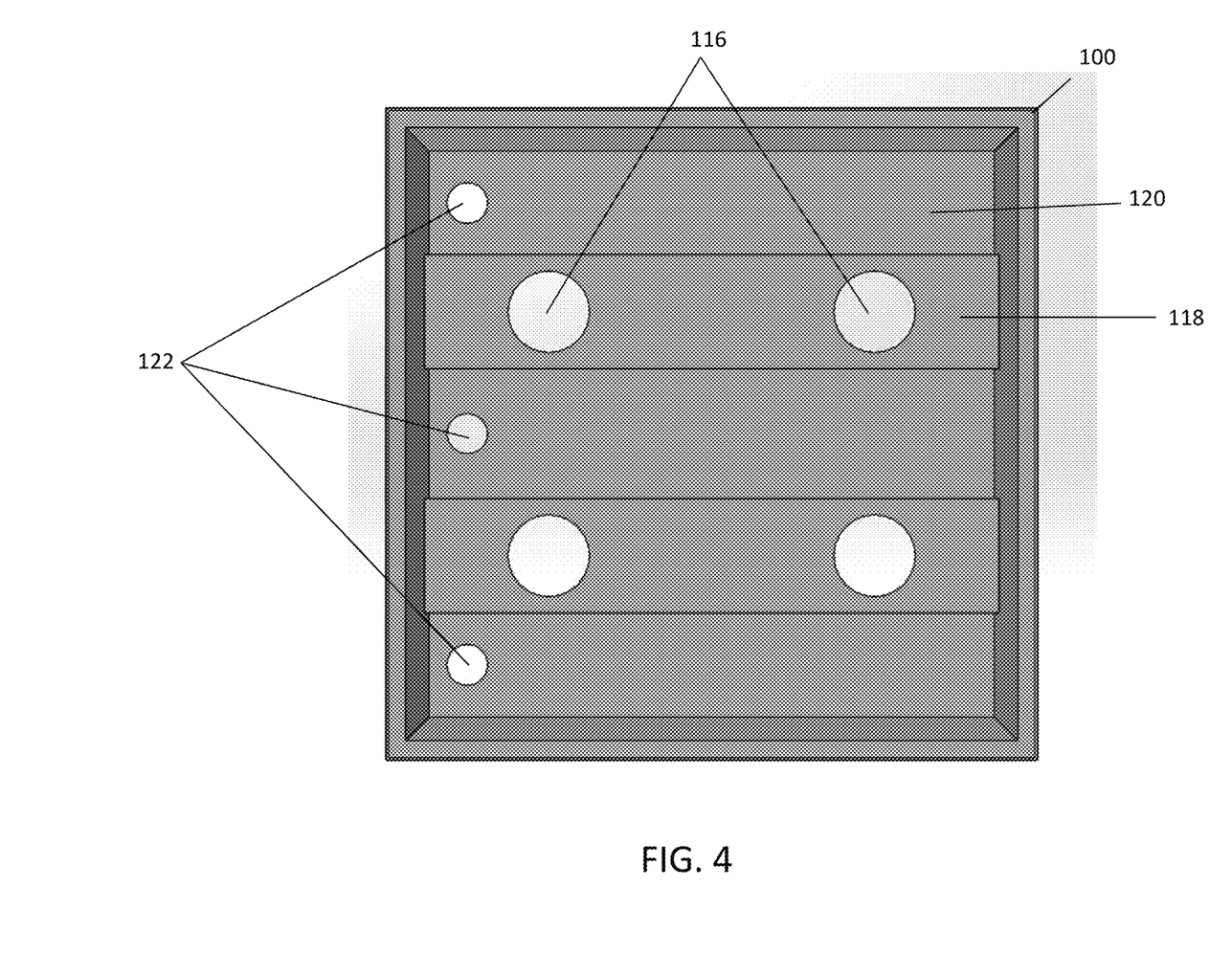
FIG. 4 is a top view of the container of FIG. 3.

As shown in FIGS. 3 and 4, one or more openings may be formed on the bottom of the container to assist with growing the crops. In some embodiments, a first group of openings 116 may be arranged to irrigate the aeroponic root zone via aeroponic irrigation. For example, in some embodiments, water may be sprayed (e.g., misted) onto the roots via the first group of openings 116. In some embodiments, the first group of openings may be positioned at or near a perimeter of the bottom of the container. In some embodiments, nozzles may be placed adjacent to or at least partially through the openings to mist water and/or nutrients to the aeroponic root zone. In other embodiments, one or more nozzles may be placed around the container, with the mist being arranged to penetrate the container via the first group of openings 116 (e.g., at or near a perimeter of the bottom of the container).

As will be appreciated, although the first group of openings is shown as being formed on a bottom of the container, in other embodiments, the first group of openings also may be formed in one or more side walls of the container.

In some embodiments, as shown in FIGS. 3 and 5, the bottom 117 of the container may be formed with one or more raised regions or ridges 118. In some embodiments, the bottom of the container may include alternating ridges and grooves. In some embodiments (see FIG. 5), a plane P2 extending through the top of the ridges may be substantially parallel to a plane P3 extending through the bottom of the container. In some embodiments, the plane P2 extending through the ridges is non coplanar with the plane P3 extending through the bottom of the container.

In some embodiments, as shown in FIG. 4, the ridges may be substantially rectangular in cross-sectional shape, although the ridges may be different shapes and sizes. In some embodiments, the shape and size of the ridges may be the same in the container, although the shape and size of the ridges may vary from ridge to ridge.

In some embodiments, the ridges extend between first and second lateral sides of the container, as shown in FIG. 4. In some embodiments, the ridges may extend all the way between first and second lateral sides, although each ridge may extend only part way between the first and second lateral sides. As will be appreciated, the length of the ridges may be the same, although the length of the ridges may vary from ridge to ridge. In some embodiments, each ridge may be formed of one or more smaller ridge members. In some embodiments, the ridge members may be aligned in a row.

In such embodiments, the openings 116 may be formed in the ridges 118 to allow the roots to be irrigated via aeroponic irrigation. In some embodiments, as shown in FIGS. 3 and 4, the first openings may be aligned in row on each ridge. In some embodiments, the openings may extend in a direction substantially perpendicular to a longitudinal axis of the container. In some embodiments, as shown in FIG. 4, each ridge may include two openings, although the row may include more or fewer openings. For example, the row may include, one, two, three, or more openings in other embodiments. In some embodiments, the number of openings may be between 0.5 to 4 holes per square foot.

Although the openings are shown as being substantially circular in cross sectional shape, the openings may have any suitable shape. For example, the openings may be square, rectangular, triangular, oval, other polygonal shape, or other suitable shape. In some embodiments, the openings may have the same shape and size, although the shape and size of the openings may vary from ridge to ridge and/or from opening to opening. In some embodiments, each ridge may include the same number of openings, although the number of openings may vary from ridge to ridge (e.g., 1 longer opening in a first ridge and two smaller openings in a second ridge.

As shown in FIGS. 3 and 4, hydroponic irrigation zones may be formed in the grooves or channels 120 located in between the ridges and/or between a ridge and a side wall of the container. In some embodiments, as shown in FIG. 5, the channels may be substantially rectangular in cross sectional shape, although the channels may have other suitable shapes. As will be appreciated, the shape of the channels may be varied by varying the shape of the ridges. In some embodiments, the channels may be the same shape and size, although the shape and size of the channels may vary from channel to channel.

Although the container is shown as having three channels, the container may have more or fewer channels in other embodiments. For example, the container may have only two channels or may have more than three channels. As will be appreciated, the number of channels may be varied by varying the number of ridges in the bottom of the container.

In some embodiments, an opening 122 may be formed in each channel, such as to periodically drain the water and/or nutrients in the channel. As with the openings in the ridges, the shape and size of the openings in the channel may be circular in cross sectional shape or may have another shape, such as square, rectangular, oval, triangular, other polygonal, or other shape. The shape of the openings in the channels also may vary from opening to opening and/or from channel to channel. For example, a first channel may include a square opening while a second channel may include a square opening Although one opening is shown in each channel, the channels may have more than one drain opening in other embodiments. As will be appreciated, the number of openings may vary from channel to channel.

As will be appreciated, when not being drained, each of the openings in the channels may include a plug to block the opening and maintain the water in the channel. In some embodiments, the opening may be blocked via other suitable members, such as slides or doors.

Turning back to FIG. 1, the container may include a body or tray with four side walls, a bottom, and a cavity for holding the root zone of the crops. In some embodiments, as shown in FIG. 5, the container may be tapered, with the side walls being angled relative to a plane P1 extending through a top surface 119 of the container. For example, in such embodiments, a top of the root zone 101 of the container may be larger than a bottom of the root zone of the container. In some embodiments, as shown in FIG. 5, the container may have more than one tapered region. For example, as shown in this FIG. 5, the contain may have a first taper in the aeroponic zone 102 and a second taper in the hydroponic zone 104. In some embodiments, the taper of the hydroponic zone may be greater (e.g., a greater angle) than a taper of the aeroponic zone.

In some embodiments, the container may have a wall thickness of between about 0.0625 inches and about 0.25 inches. As will be appreciated, the container may have other suitable thicknesses in other embodiments. In some embodiments, the width and/or length of the container may each be between about 1 ft and 8 ft in size. For example, the container may be 1 ft by 1 ft, 2 ft by 4 ft, 8 ft by 8 ft. As will be appreciated, the container may have other suitable sizes depending upon the crops being grown. For example, for smaller crops, a smaller container may be used while suitable lengths and heights depending upon the crops being grown.

Figure 7:
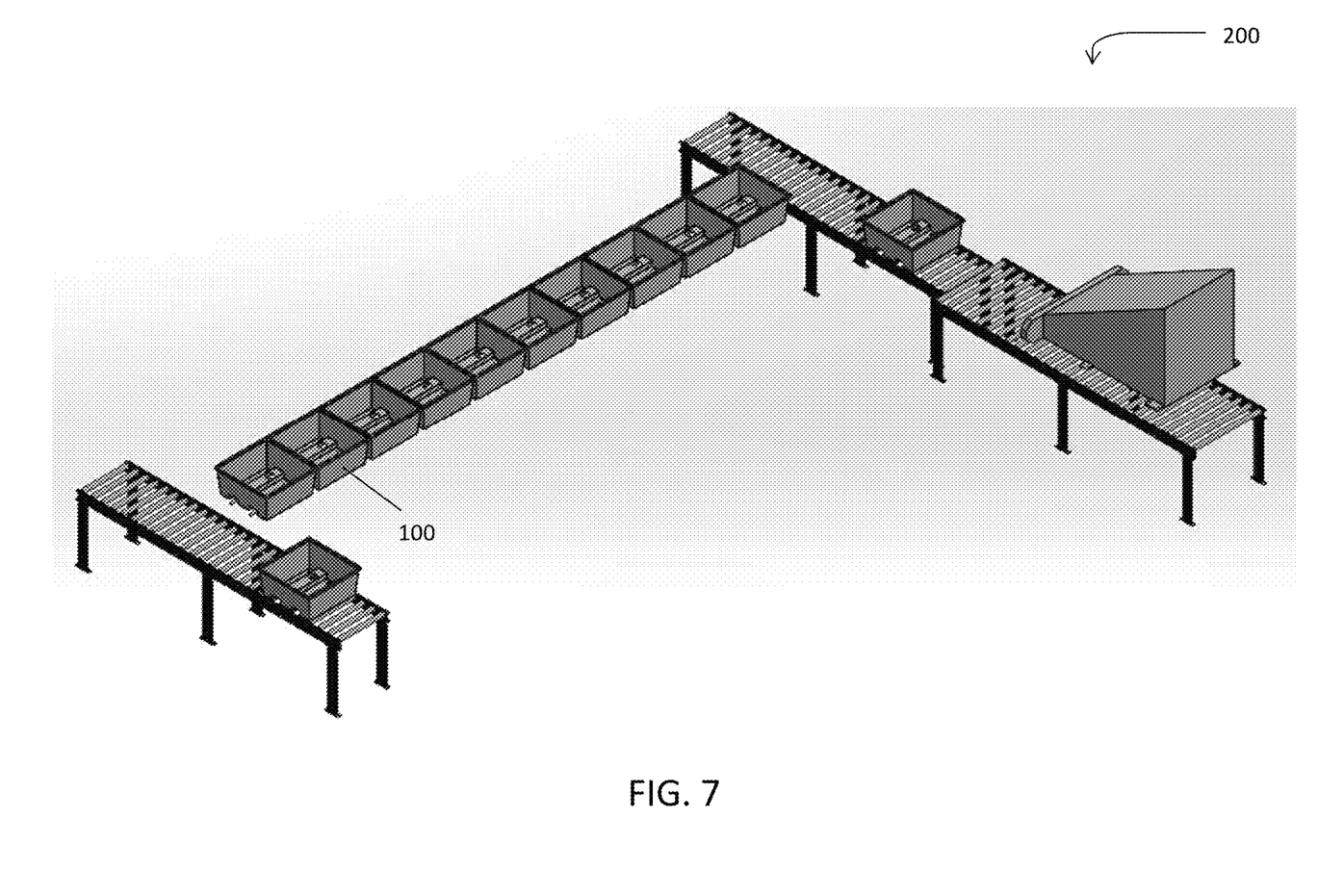
FIG. 7 illustrates an automated farming system with containers for growing crops according to some embodiments.

FIG. 7 shows an example of the container 100 in a farming system 200 according to some embodiments of the present disclosure. In some embodiments, the containers may rest on a conveyor arranged to move the container between different stations of the farming system. In such embodiments, the shape of the bottom of the container is arranged to correspond with the shape of the conveyor of the farming system.

According to another embodiment, a method of growing one or more crops via the container is disclosed. In some embodiments, the method may include hydroponically irrigating a hydroponic root zone in the hydroponic irrigation zone of the container and aeroponically irrigating an aeroponic root zone in the aeroponic irrigation zone of the container. In some embodiments, the method includes supplying water and/or nutrients to one or more channels in the hydroponic irrigation zone and disposing at least a portion of the hydroponic root zone in the water and/or nutrients in the channel. In some embodiments, the method also includes misting water and/or nutrients to the aeroponic root zone via one or more openings in the bottom of the container. In some embodiments misting includes providing a mist via nozzles positioned around the box, with the mist penetrating the container via the openings formed in the ridges on the bottom of the container. In some embodiments, misting includes placing one or more nozzles adjacent to and/or inserting one or more nozzles at least partially through the openings in the bottom of the Container.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for growing crops, comprising:
   a container;
   a hydroponic irrigation zone arranged to provide hydroponic irrigation to a first portion of a root zone of a crop wherein the first portion of the root zone is partially submerged in the hydroponic irrigation zone;
   an aeroponic irrigation zone arranged to provide aeroponic irrigation to a second portion of the root zone at the same time that the hydroponic irrigation zone provides hydroponic irrigation to the first portion of the root zone of the crop;
   a conveyor configured to move the container through the hydroponic irrigation zone and the aeroponic irrigation zone;
   an irrigation manifold separate from and not connected to the container;
   a plurality of raised ridges at a bottom of the container, wherein a shape of the bottom of the container corresponds to a shape of the conveyor and to the irrigation manifold so that the conveyor may pass by the irrigation manifold;
   a plurality of oval holes within the plurality of raised ridges at the bottom of the container;
   a plurality of nozzles separate from the container positioned near corresponding ones of the plurality of oval holes for receiving mist to provide the aeroponic irrigation wherein the plurality of oval holes within the plurality of raised ridges at the bottom of the container are large enough to accommodate a size of the plurality of nozzles and small enough to prevent roots of the crop from protruding from the container and being damaged during movement of the container on the conveyor, wherein the plurality of nozzles are separate from and not connected to the container;
   a plurality of automatically actuated removable plugs corresponding to the plurality of oval holes for selectively draining water from the container, the plurality of removable plugs having a corresponding plurality of doors or slides; and
   a substantially flat growing surface having a first side and a second side opposite to the first side, the first side arranged to receive one or more seeds and the second side arranged to receive the mist of the aeroponic irrigation, wherein the substantially flat growing surface comprises a material secured at or near the top of the container, the material comprising a fabric comprising one or more of bamboo fiber, felt, burlap, biostrate, Rockwoll, and coco coir.

2. The container of claim 1, wherein the container includes four side walls, and a cavity for receiving the first portion of the root zone and the second portion of the root zone.

3. The container of claim 1, wherein the container is tapered to decrease distances between corresponding ones of the plurality of nozzles and the plurality of oval holes.

4. The container of claim 1, wherein a bottom of the container includes one or more channels between the plurality of raised ridges and within the first portion of the root zone configured to supply nutrients and/or water for hydroponic irrigation regardless of whether aeroponic irrigation is provided by mist via the plurality of nozzles, the first portion of the root zone arranged to be at least partially disposed in the nutrients and/or water.

5. The container of claim 4, wherein each of the one or more channels includes an opening arranged to drain the water and/or nutrients from the respective channel, the opening having a corresponding removable plug having a door or slide.

6. The container of claim 1, wherein the substantially flat growing surface is directly attached to the container.

7. The container of claim 1, wherein the seeds are arranged to be loaded on or at least partially in the substantially flat growing surface.

8. The container of claim 1, further comprising a frame directly attached to the container, wherein the container comprises an upper lip, the frame corresponds to a shape of the upper lip of the container, and the substantially flat growing surface is directly attached to the frame.

9. The container of claim 8, wherein the substantially flat growing surface and the frame are configured to form a barrier confining some roots of the crops to the first portion of the root zone and other roots of the crops to the second portion of the root zone.

* * * * *